Dec. 23, 1958 B. N. NIXON 2,865,653
ACCESS DOOR FOR VEHICLE FUEL INLET
Filed Sept. 21, 1956 2 Sheets-Sheet 1

INVENTOR.
BY Blair N. Nixon
L. D. Burch
ATTORNEY

Dec. 23, 1958  B. N. NIXON  2,865,653
ACCESS DOOR FOR VEHICLE FUEL INLET
Filed Sept. 21, 1956  2 Sheets-Sheet 2
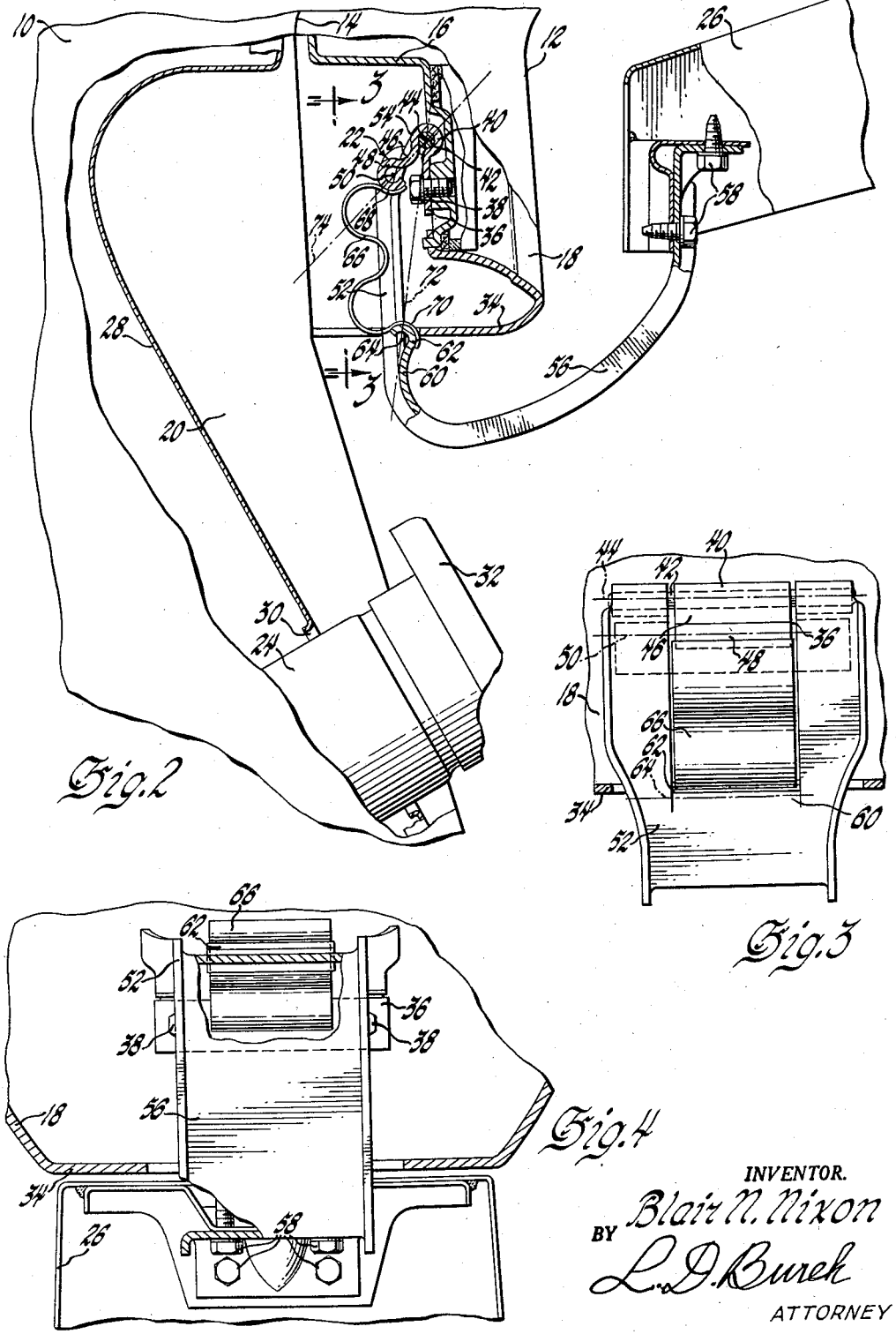
INVENTOR.
Blair N. Nixon
BY L. D. Burek
ATTORNEY though the access door is swinging. The access door
is hinged to swing longitudinally of the automotive
vehicle to prevent injury either to the door or to any
object which may come in contact with it.

2,865,653

ACCESS DOOR FOR VEHICLE FUEL INLET

Blair N. Nixon, Lansing, Mich., assignor to General
Motors Corporation, Detroit, Mich., a corporation of
Delaware Application September 21, 1956, Serial No. 611,263

2 Claims. (Cl. 280—152)

The invention relates to access mechanism for a fuel filler neck and more particularly to such mechanism which may be located in the rear fender of an automotive vehicle adjacent a rear lamp mounted in the fender.

It has been previously proposed and is common practice to provide fuel tank access doors in combination with rear lamps for an automotive vehicle. By providing the access opening in the same area in which the rear lamp is located, the requirement for having the fuel tank filler neck extend from the vehicle body is eliminated, thus no longer presenting body extensions which may be unsightly in appearance and present the possibility of hooking objects which may be passing near such extensions, thus causing injury to the automotive vehicle or the object contacted, or both. Fuel tank filler necks have also previously been terminated within fender bodies with a separate access door provided in the side of the body. These doors, however, interrupt the design lines of the vehicle and have often been subject to damage when left open inadvertently. When vehicle rear lamps have been combined in the door for fuel filler neck access openings, they have in the past been hinged to the body and movable with the door. This created a large hinged mass and the additional problem of wiring which must be arranged to allow frequent movement of the rear lamp without chafing. The lamps were also subjected to additional shocks which shortened their useful life.

It is now proposed to overcome the disadvantages inherent in the previous filler neck doors while retaining the advantages of mounting a filler neck door adjacent the rear lamp. A filler access door mechanism embracing the invention therefore is provided in which the door is independent of the tail lamp but immediately adjacent thereto and is preferably hinged to swing longitudinally of the automotive vehicle at the fender trailing edge in order to eliminate danger of injury either to or by the door if inadvertently left open.

In the drawings:

Figure 2 shows the mechanism of Figure 1 with the filler access door in an open position.

Figure 3 is a view of the hinge and spring of the mechanism of Figure 2 taken in the direction of arrows 3—3 on Figure 2.

Figure 4 is a view of the hinge and spring mechanism of Figure 1 taken in the direction of arrows 4—4 of Figure 1.

Figure 1:
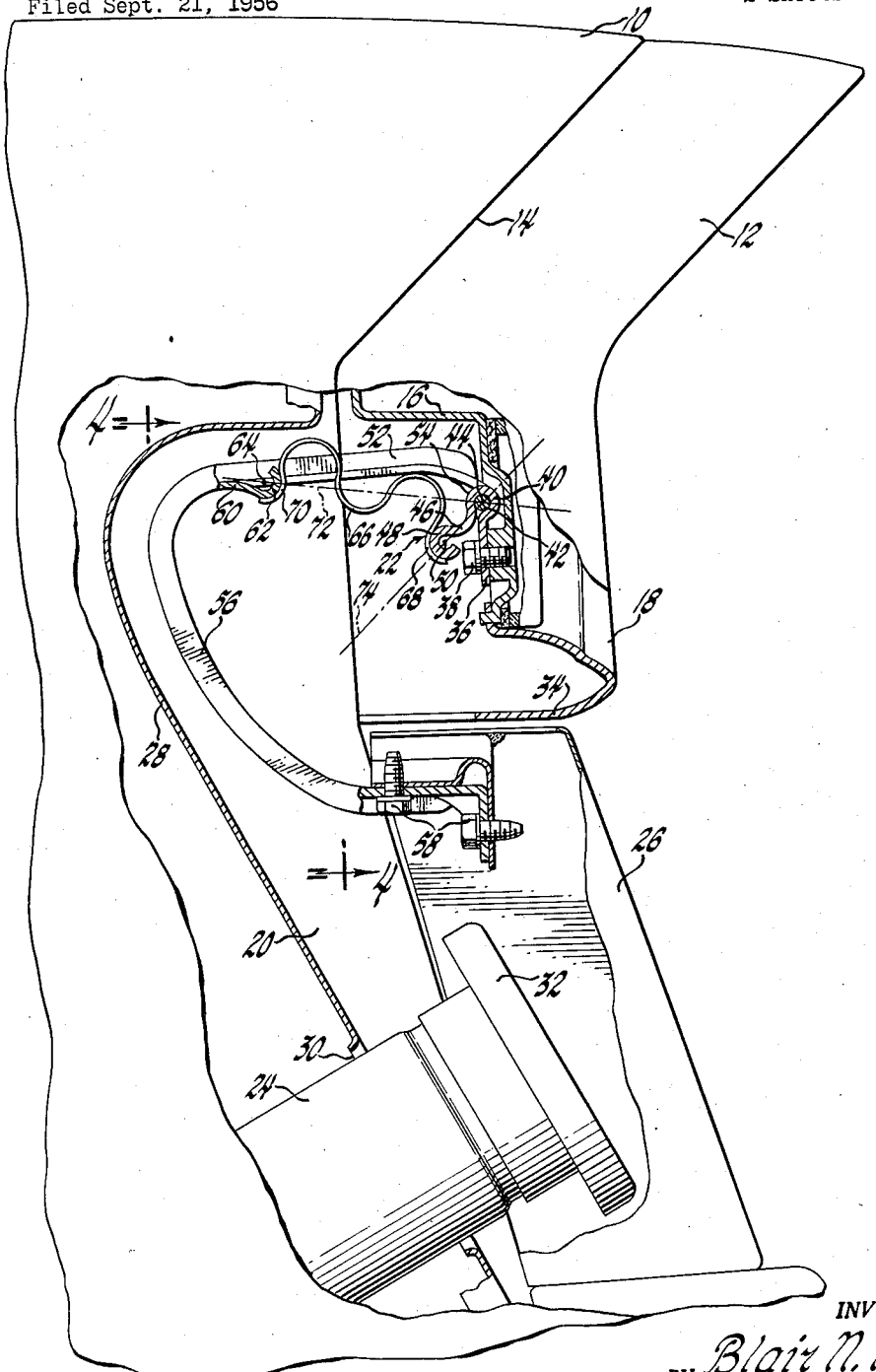
Figure 1 is a fragmentary view of an automotive vehicle with parts broken away and in section and showing a filler access mechanism in a closed position and embodying the invention.

A fuel filler mechanism embodying the invention may be mounted in the rear fender 10 of an automotive vehicle which has a rear lamp assembly 12 secured along its trailing edge 14. Lamp assembly 12 may include a lamp support 16 and a protective and decorative external molding 18. The trailing edge 14 of fender 10 may be provided with a hinge receiving space 20 extending from a point adjacent the lower portion of lamp assembly 12 to a point sufficiently below the lamp assembly to provide space for a hinge 22, a fuel tank filler neck 24 and a filler access door 26. Space 20 may be separated from the interior of fender 10 by a wall 28 which may be provided with an aperture 30 through which filler neck 24 extends from the interior of the vehicle fender into space 20. Filler neck 24 may terminate within space 20 and have a cap 32 of any known type to provide a closure for the fuel tank. Filler access door 26 may be swingingly secured to lamp support 16 by hinge 22 and when in a closed position is preferably located underneath and immediately adjacent the lower terminal 34 of molding 18. It may provide a design continuation of the molding so as to present a continuous appearance when the vehicle is viewed from the rear. Hinge 22 is preferably composed of a leaf section 36 which may be secured by any convenient means such as bolts 38 to the lamp support 16. Leaf section 36 may have one or more hinge pin receiving sockets 40 formed thereon along one edge and adapted to receive a hinge pin 42 along hinge axis 44. An overcenter spring mounting lug 46 may be struck from leaf section 36 and reverse bent so as to extend from section 36 and have a generally cylindrical spring seat 48 formed at its outer end. Spring seat 48 is preferably formed so that its axis 50 is parallel to hinge axis 44. Since lug 46 is formed from stationary leaf section 36 it is stationary relative to the lamp support 16. Hinge 22 has a movable section 52 which has one or more hinge pin receiving sockets 54 formed along one edge and adapted to be interlaced with the hinge pin receiving socket 40 of the stationary leaf section 36 and to receive hinge pin 42 therein to hold sections 36 and 52 in a hinged relation. Hinge movable section 52 preferably has a generally C-shaped portion 56 extending from sockets 54 and terminating adjacent filler access door 26, to which it may be secured by any convenient means such as bolts 58. C-shaped portion 56 may have a tongue 60 struck therefrom adjacent the hinge axis and remaining attached to C-shaped portion 56 at a point spaced from the hinge axis. Tongue 60 may be foreshortened and reverse bent to form a generally cylindrical spring seat 62 having an axis 64 which is preferably parallel to hinge axis 44 and spring seat axis 50.

An overcenter spring 66 which is curved in cross section may have spring seat receiving sockets 68 and 70 formed on either end and adapted to be seated on spring seats 48 and 62. When spring 66 is in engagement with seats 48 and 62 it may be pivoted about axes 50 and 64 when movable section 52 of the hinge is pivoted about hinge axis 44.

When the hinge is in a position whereby the filler access door is held in a closed relation, a plane 72 passing through hinge axis 44 and movable spring seat axis 64 intersects a plane 74 passing through hinge axis 44 and stationary spring seat axis 50. As the filler access door 26 is opened, plane 72 approaches and passes through and beyond plane 74 so that movable spring seat axis 64 lies on the opposite side of plane 74 relative to the position it occupied when the door was in a closed position. Spring 66 is therefore enabled to impart an overcenter action, yielding a force which will tend to hold hinge 22 and access door 26 in either an open or a closed position. In order to provide an overcenter spring which will properly react under the above conditions, it is preferable to use a leaf spring having a generally sinuous or undulating cross section. Spring 66 may thus be formed with one or more curves which may increase the spring action.

A filler access mechanism has been provided which may be mounted in the rear fender of an automotive vehicle immediately adjacent the rear lamp located in the fender. The filler door is independently pivoted, allowing the rear lamp to be secured in a stationary position relative to the fender while providing a convenient access to the fuel tank filler neck with a minimum danger to either the access door or objects which may come in contact with the door. The mechanism allows a functional arrangement of the filler access door relative to the rear lamp.

What is claimed is:

1. In combination with an access door for a fuel filler neck in an automotive vehicle, a rear lamp support and a hinge, said support being secured to a portion of said vehicle and having a decorative and protective molding mounted thereon in a generally vertical disposition, said molding having its lower terminal end disposed immediately above an access opening providing access to said filler tube, said door being hinged to said rear lamp support and including an exterior portion providing a closure for said opening and disposed immediately adjacent said molding lower terminal end when in a closed position so as to form a design continuation thereof, said hinge supporting said door on said lamp support and having a first section secured to said lamp support and a second section secured to said door and a hinge pin holding said sections in hinged relation and return bent pivots formed on each of said sections and receiving an overcenter leaf spring whereby said spring may move about said pivots during opening and closing movements of said door and transmit overcenter actuation thereto.

2. In combination, an automotive vehicle rear lamp having a support bracket and external molding, said lamp being adapted to be secured in an automotive vehicle rear fender, a fuel tank filler neck extending into said fender and terminating underneath said lamp bracket, an access door having hinge means secured to said lamp support bracket and providing access to said filler neck, said door having an external portion adjacent said molding and forming an independently mounted extension thereof, said hinge means having a first pivot formed on the door portion thereof and a second pivot formed on the lamp portion thereof, said pivots receiving an overcenter spring and being spaced relative to the axis of said hinge whereby overcenter action may be imparted by said spring to said hinge, said spring having a multi-curved cross section with pivotal contact ends formed by the termini of said multiple curves.

References Cited in the file of this patent

UNITED STATES PATENTS

| | | |
|---|---|---|
| 1,895,590 | Spencer | Jan. 31, 1933 |
| 2,023,224 | Hall | Dec. 3, 1935 |
| 2,606,772 | Mead | Aug. 12, 1952 |

FOREIGN PATENTS

| | | |
|---|---|---|
| 931,710 | Germany | Aug. 16, 1955 |
| 521,557 | Great Britain | May 24, 1940 |